US011112306B2

(12) United States Patent
Wong et al.

(10) Patent No.: US 11,112,306 B2
(45) Date of Patent: Sep. 7, 2021

(54) REAL-TIME OPTICAL SPECTRO-TEMPORAL ANALYZER AND METHOD

(71) Applicant: THE UNIVERSITY OF HONG KONG, Hong Kong (CN)

(72) Inventors: Kin Yip Kenneth Wong, Hong Kong (CN); Xiaoming Wei, Hong Kong (CN); Bowen Li, Hong Kong (CN); Ying Yu, Hong Kong (CN); Chi Zhang, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 15 days.

(21) Appl. No.: 16/496,748

(22) PCT Filed: Mar. 23, 2017

(86) PCT No.: PCT/CN2017/077843
§ 371 (c)(1),
(2) Date: Sep. 23, 2019

(87) PCT Pub. No.: WO2018/170824
PCT Pub. Date: Sep. 27, 2018

(65) Prior Publication Data
US 2020/0033189 A1    Jan. 30, 2020

(51) Int. Cl.
*G01J 3/18* (2006.01)
*G01J 3/02* (2006.01)
*H04J 14/02* (2006.01)

(52) U.S. Cl.
CPC .......... *G01J 3/1895* (2013.01); *G01J 3/0218* (2013.01); *H04J 14/02* (2013.01)

(58) Field of Classification Search
CPC ........ G01J 3/1895; G01J 3/0218; H04J 14/02; G01M 11/02; H04R 25/502
See application file for complete search history.

(56) References Cited

U.S. PATENT DOCUMENTS 5,760,898 A * 6/1998 Haley ................... G01J 3/457
356/318
RE36,529 E * 1/2000 Lewis .................. G01J 3/2823
250/339.02
(Continued)

FOREIGN PATENT DOCUMENTS

CN    101813497 A    8/2010
CN    101908904 A    12/2010
(Continued)

OTHER PUBLICATIONS

Espacent English translation of CN102384836 (Year: 2010).*
International Search Report and Written Opinion in corresponding PCT Application No. PCT/CN2017/077843, dated Dec. 27, 2017.

*Primary Examiner* — Mohamed K Amara
(74) *Attorney, Agent, or Firm* — Leason Ellis LLP (57) ABSTRACT

An optical signal analyzing apparatus enables real-time and single-shot analysis simultaneously in both time and frequency domains with spectro-temporal analysis. The apparatus includes a fiber tap coupler for receiving an input optical signal from continuous wave (CW) to ultra-short pulses (femtosecond-picosecond). An optical splitter directs part of the signal to a frequency channel and part to a time channel A photodiode in the time channel directly monitors the intensity evolution and converts it to an electrical signal. In the frequency channel, two sub-channels are provided: one for CW/quasi-CW and one for short-pulse components. A signal processor analyses the time- and frequency-domain data from the time channel and frequency channel and displays the temporal and spectral evolutions simultaneously, so that the two different pieces of information of a non-repeated dynamic event can be correlated in different domains.

19 Claims, 5 Drawing Sheets

(56) References Cited

U.S. PATENT DOCUMENTS

| | | | |
|---|---|---|---|
| 6,421,152 B1* | 7/2002 | Yoon | H04J 14/02 398/87 |
| 7,224,906 B2* | 5/2007 | Cho | H04B 10/2543 398/183 |
| RE42,236 E* | 3/2011 | Geile | H04H 60/11 370/203 |
| 9,110,219 B1* | 8/2015 | Zhang | G01J 1/0425 |
| 9,335,261 B2* | 5/2016 | Nakamura | G01N 21/3586 |
| 9,829,429 B2* | 11/2017 | Cyr | G06F 17/18 |
| 9,835,840 B2* | 12/2017 | Jalali | G01B 9/02091 |
| 10,797,684 B1* | 10/2020 | Benz | H03K 3/38 |
| 2001/0032334 A1* | 10/2001 | Dapper | H04H 60/11 725/105 |
| 2002/0131156 A1* | 9/2002 | Chou | G02F 1/365 359/332 |
| 2004/0233513 A1* | 11/2004 | Shahar | G02B 6/125 359/326 |
| 2007/0140705 A1* | 6/2007 | Shpantzer | H04B 10/508 398/189 |
| 2007/0166054 A1* | 7/2007 | Yu | H04B 10/2575 398/188 |
| 2007/0269066 A1 | 11/2007 | Derleth et al. | |
| 2007/0286603 A1* | 12/2007 | Minato | H04J 14/02 398/53 |
| 2009/0012387 A1* | 1/2009 | Hanson | G01R 33/3692 600/411 |
| 2010/0014079 A1* | 1/2010 | Yamashita | G01J 11/00 356/303 |
| 2011/0261354 A1* | 10/2011 | Sinfield | G01J 3/0291 356/301 |
| 2013/0322473 A1* | 12/2013 | Palaniyappan | H01S 3/0014 372/21 |
| 2013/0342835 A1* | 12/2013 | Blacksberg | G01J 3/2889 356/301 |
| 2014/0147928 A1* | 5/2014 | Steinebach | G01N 33/5002 436/164 |
| 2015/0308892 A1* | 10/2015 | Feng | G01J 3/0224 356/327 |
| 2016/0006453 A1* | 1/2016 | Jalali | H03M 7/3059 341/87 |
| 2017/0146458 A1* | 5/2017 | Huber | H01S 3/10015 |
| 2017/0205255 A1* | 7/2017 | Nannipieri | H04B 10/0731 |
| 2018/0329272 A1* | 11/2018 | Muir | G02F 1/3517 |

FOREIGN PATENT DOCUMENTS

| | | |
|---|---|---|
| CN | 102384836 A | 3/2012 |
| CN | 102882553 A | 1/2013 |
| CN | 105334182 A | 2/2016 |

* cited by examiner

REAL-TIME OPTICAL SPECTRO-TEMPORAL ANALYZER AND METHOD

CROSS-REFERENCE TO RELATED PATENT APPLICATIONS

This application is a U.S. National Phase Application under 35 U.S.C. § 371 of International Patent Application No. PCT/CN2017/077843, filed Mar. 23, 2017, which is incorporated herein by reference in its entirety. The International Application was published in English on Sep. 27, 2018 as International Publication No. WO/2018/170824 A1.

FIELD OF THE INVENTION

The present invention relates to optical signal analyzing apparatus and method, and more particularly to an apparatus and method that enables real-time analysis of a laser output simultaneously in both time and frequency domains.

BACKGROUND OF THE INVENTION

Optical sources have gained significant popularity over last decades owing to their widespread applications. Their various playgrounds include optical communication, material processing, astronomical exploration, biological imaging and other scientific studies, e.g., optical arbitrary waveform generation and coherent spectroscopy, to name a few. See, G P. Agrawal, *Fiber-Optic Communication Systems*, 3rd ed. (Wiley, New York, 2002); L. Shah et al., "Waveguide writing in fused silica with a femtosecond fiber laser at 522 nm and 1 MHz repetition rate," *Opt. Express* 13, 1999-2006 (2005); R. R. Gattass and E. Mazur, "Femtosecond laser micromachining in transparent materials," *Nat. Photon.* 2(4), 219-225 (2008); T. Wilken et al., "A spectrograph for exoplanet observations calibrated at the centimetre-per-second level," *Nature* 485, 611 (2012); T. Steinmetz et al., "Laser Frequency Combs for Astronomical Observations," *Science* 321, 1335 (2008); C. Xu and F. W. Wise, "Recent advances in fibre lasers for nonlinear microscopy," *Nat. Photonics* 7, 875 (2013); N. G. Horton et al., "In vivo three-photon microscopy of subcortical structures of an intact mouse brain," *Nat. Photonics* 7, 205-209 (2013); C. W. Freudiger et al., "Stimulated Raman scattering microscopy with a robust fibre laser source," *Nat. Photonics* 8, 153-159 (2014); G. Krauss et al., "Synthesis of a single cycle of light with compact erbium-doped fibre technology," *Nat. Photon.* 4, 33 (2010); S. T. Cundiff and A. M. Weiner, "Optical arbitrary waveform generation," *Nat. Photonics* 4(11), 760-766 (2010); and I. Coddington et al., "Coherent Multiheterodyne Spectroscopy Using Stabilized Optical Frequency Combs," *Phys. Rev. Lett.* 100, 013902 (2008), all of which are incorporated herein by reference in their entirety.

Despite its practical applications, optical nonlinear dynamics involved in optical sources have also served as a fruitful field for inter-disciplinary researches, e.g., soliton interaction, soliton pairing/molecule, optical rogue wave and other dynamic spectro-temporal evolutions. See, J. K. Jang et al., "Ultraweak long-range interactions of solitons observed over astronomical distances," *Nat. Photonics* 7, 657-663 (2013); F. Amrani et al., "Passively mode-locked erbium-doped double-clad fiber laser operating at the 322nd harmonic," *Opt. Lett.* 34, 2120-2122 (2009); P. Grelu and N. Akhmediev, "Dissipative solitons for mode-locked lasers," *Nat. Photonics* 6, 84-92 (2012); S. Chouli and P. Grelu, "Rains of solitons in a fiber laser," *Opt. Express* 17, 11776-11781 (2009); E. G. Turitsyna et al., "The laminar-turbulent transition in a fibre laser," *Nat. Photonics* 7(10), 783-786 (2013); D. V. Churkin et al., "Stochasticity, periodicity and localized light structures in partially mode-locked fibre lasers," *Nat. Commun.* 6, 7004 (2015); D. R. Solli et al., "Optical rogue waves," *Nature* 450, 1054 (2007) (hereinafter "Solli"); J. M. Soto-Crespo et al., "Dissipative rogue waves: Extreme pulses generated by passively mode-locked lasers," *Phys. Rev. E* 84, 016604 (2011); C. Lecaplain et al., "Dissipative rogue waves generated by chaotic pulse bunching in a mode-locked laser," *Phys. Rev. Lett.* 108(23), 233901 (2012); and J. M. Dudley et al., "Instabilities, breathers and rogue waves in optics," *Nat. Photonics* 8, 755 (2014), all of which are incorporated herein by reference in their entirety.

Optical laser sources have been widely used in numerous applications. However, any perturbation in the laser cavity can induce a drastic change in the output. These unpredictable nonlinear disturbances occur in an ultrafast transition way. Thus, a good way to better understand these nonlinear laser dynamics is required for understanding and mastering this behavior.

To visualize and diagnose these intriguing nonlinear dynamics, ultrafast detection simultaneously in both time and frequency domains is essential, which unfortunately is a historical problem owing to limitations in both spectro-temporal resolution and recording length. See, D. Abraham et al., "Transient dynamics in a self-starting passively mode-locked fiber-based soliton laser," *Appl. Phys. Lett.* 63, 2857 (1993); H. Li et al., "Starting dynamics of dissipative-soliton fiber laser," *Opt. Lett.* 35, 2403-2405 (2010); and J. Wang et al., "Pulse dynamics in carbon nanotube mode-locked fiber lasers near zero cavity dispersion," *Opt. Express* 23, 9947-9958 (2015), all of which are incorporated herein by reference in their entirety.

Recently, photonic time-stretch (TS) has been demonstrated to be a powerful single-shot spectral analyzer. See, D. R. Solli et al., "Amplified wavelength-time transformation for real-time spectroscopy," *Nat. Photonics* 2, 48 (2008); K. Goda et al., "Serial time-encoded amplified imaging for real-time observation of fast dynamic phenomena," *Nature* 458(7242), 1145-1149 (2009); and K. Goda and B. Jalali, "Dispersive Fourier transformation for fast continuous single-shot measurements," *Nat. Photonics* 7, 102 (2013). Its superior performance in spectro-temporal resolution, working bandwidth and record length, has enabled spectral visualizations of various nonlinear dynamics, e.g., supercontinuum generation, rogue wave excitation, soliton explosion and mode-locking birth. See, Solli as well as B. Wetzel et al., "Real-time full bandwidth measurement of spectral noise in supercontinuum generation," *Sci. Rep.* 2, 882 (2012); C. Lecaplain and Ph. Grelu, "Rogue waves among noiselike-pulse laser emission: An experimental investigation," *Phys. Rev. A* 90, 013805 (2014); A. F. J. Runge et al., "Raman rogue waves in a partially mode-locked fiber laser," *Opt. Lett.* 39, 319-322 (2014); A. F. J. Runge et al., "Observation of soliton explosions in a passively mode-locked fiber laser," *Optica* 2, 36-39 (2015); M. Liu et al., "Successive soliton explosions in an ultrafast fiber laser," *Opt. Lett.* 41, 1181-1184 (2016); and G. Herink et al., "Resolving the build-up of femtosecond mode-locking with single-shot spectroscopy at 90 MHz frame rate," *Nature Photon.* 10, 321-326 (2016).

However, despite its ability to capturing spectral information of ultra-short pulses (femtosecond-picosecond (fs-ps)), TS spectroscopy (TSS) is invalid for continuous-wave (CW)/quasi-CW signals. Consequently, any CW/quasi-CW component involved in the optical dynamics will be concealed by the TS spectroscope, resulting in defective information, particularly for those ultrafast nonlinear dynamic events evolved from CW/quasi-CW states. Very recently, heterodyne-based high-speed spectral analyzer has also been proposed for spectral characterization of quasi-CW lasers. See, S. Sugavanam et al., "Real-time high-resolution heterodyne-based measurements of spectral dynamics in fibre lasers," *Sci Rep* 6, 23152 (2016), which is incorporated herein by reference in its entirety.

Unfortunately, the working wavelength is very limited (few pm), which in return disables the spectral visualization of ultrashort pulses.

U.S. Pat. No. 6,665,069 discloses a temporal analyzer, but it can only provide frequency information in a very slow manner, similar to a conventional optical spectrum analyzer (OSA) and with no time-domain information. U.S. Pat. No. 7,821,633 describes apparatus and a method for Raman spectroscopy and microscopy with time domain spectral analysis. However, it can only provide frequency information, not time-domain information. In addition, it only works for ultra-short pulses in the fs-ps range, but not for those in longer time scales, e.g., CW-Q-switched.

SUMMARY OF THE INVENTION

The present invention is directed to a versatile real-time optical spectro-temporal analyzer (ROSTA) and method that enable both real-time and single-shot signal analysis simultaneously in both time and frequency domains for non-repetitive ultrafast optical events. It accommodates any optical input conditions, from CW to ultra-short pulses, and is therefore a powerful tool to explore ultrafast optical dynamics The dynamic optical signal can be launched into the ROSTA system through a fiber tap coupler. ROSTA captures the non-repeated dynamic event in both time and frequency domains. It directly monitors the intensity evolution (variation in intensity over time) through a high-speed photo diode, but captures the spectral information by two sub-channels specified for CW/quasi-CW and short-pulse components, respectively. After data processing, the temporal and spectral evolutions are displayed simultaneously so that the two different pieces of information of a non-repeated dynamic event in different domains can be correlated. Basically, ROSTA spectrally treats the incident signal in two different sub-branches, i.e., TSS for a pulse signal and parametric time-lens (TL) spectroscopy (TLS) for a CW signal.

The advantages of ROSTA versus existing techniques include:

1) It accommodates a much wider range of optical signals, i.e., from ultra-short pulses to CW/quasi-CW optical signals. Therefore, more accurate spectral analysis can be conducted on complex optical dynamics, which mostly involves signals far beyond pure ultra-short pulses or pure CW/quasi-CW signals;

2) In addition to ultrafast spectral analysis, time-domain intensity that instantaneously corresponds to the optical spectrum is simultaneously monitored. By such synchronized spectro-temporal analysis, a deeper understanding of complex nonlinear dynamics can be obtained. Therefore, ROSTA is a powerful tool for real-time spectro-temporal analysis, which significantly facilitates the comprehensive study of various complex phenomena in optical nonlinear systems.

In the time domain ROSTA provides a temporal resolution of ~70 ps for signal intensity monitoring. Simultaneously in the frequency domain it operates at a temporal resolution of ~12 ns and a spectral resolution better than 0.03-0.2 nm. Further it has a large memory depth so that non-recurring events can be recorded for longer periods of time, e.g., up to 10's of milliseconds. In the application, "10's" means a range of 10-100, while "100's" means a range of 100-1000.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF EXEMPLARY EMBODIMENTS

Figure 1:
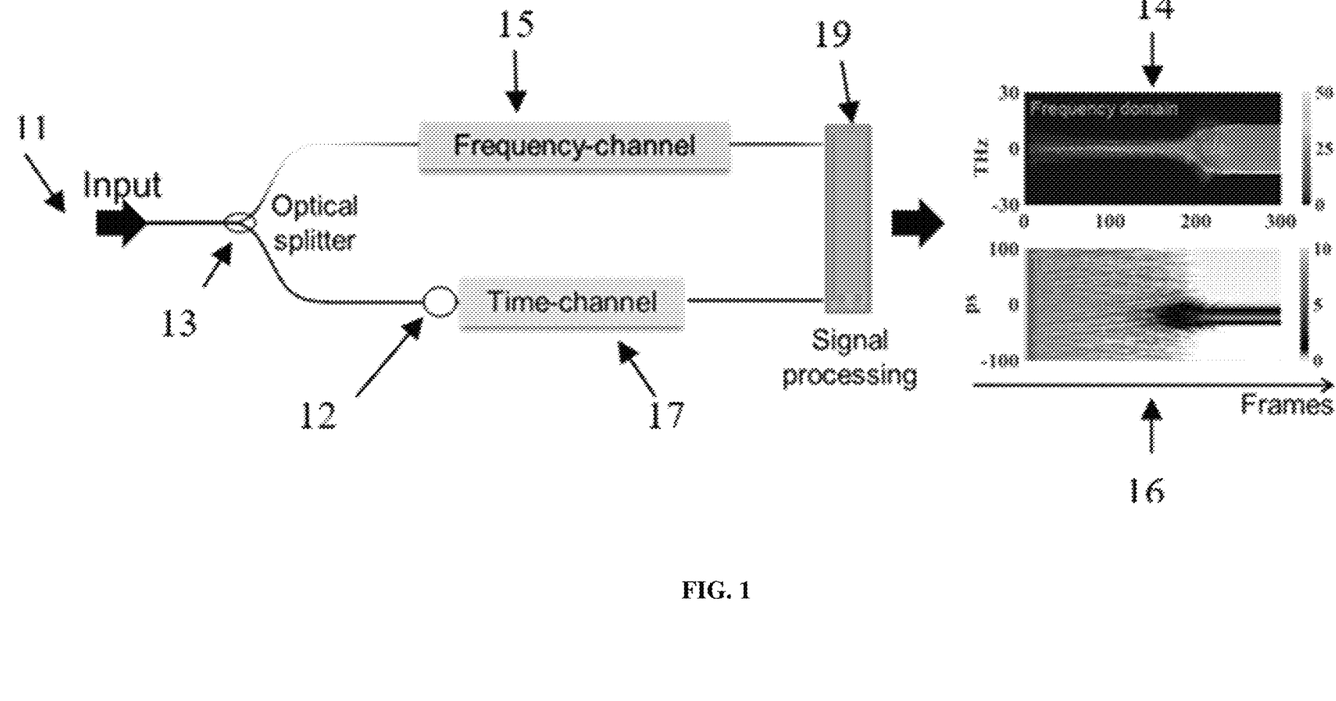
FIG. 1 is an overview of the ROSTA system according to an embodiment of the present invention.

FIG. 1 shows an overview of a versatile ROSTA system and method according to an exemplary embodiment of the present invention. Basically, the optical signal is simultaneously diagnosed in two different domains, i.e., frequency domain/channel and time domain/channel. Then, a comprehensive picture of the spectro-temporal information of the optical signal is obtained through data processing.

An optical signal is launched into the ROSTA system through a fiber tap coupler at input 11. The signal is passed to an optical splitter 13 which directs part of the signal to a frequency channel 15 and part to a time channel 17. Thus, ROSTA captures the non-repeated dynamic event in both time and frequency domains. In the time domain, ROSTA directly monitors the intensity evolution through a photodiode (PD) 12. In the Frequency Domain, ROSTA captures the spectral information with two sub-channels specified for quasi-CW and short-pulse components, respectively. The frequency and time domain data is analyzed in the signal processor 19. After data processing, the spectral and temporal evolutions are displayed simultaneously in displays 14, 16, so that the two different pieces of information of a non-repeated dynamic event can be correlated in different domains.

In the time domain, the intensity of the input optical signal is directly detected and converted to an electrical signal by the PD 12, which for example has a bandwidth of 10's GHz, thus typically providing a temporal resolution of 10's ps for time-domain information, e.g., 50 ps for an off-the-shelf 20-GHz photodetector. The electrical signal is then sampled and digitized at a Nyquist rate of 10's GS/s by a multi-channels digitizer located in signal processor 19 with a recording length that can be up to 10's ms, e.g., 6.4 ms was used in a preliminary study.

Figure 2A:
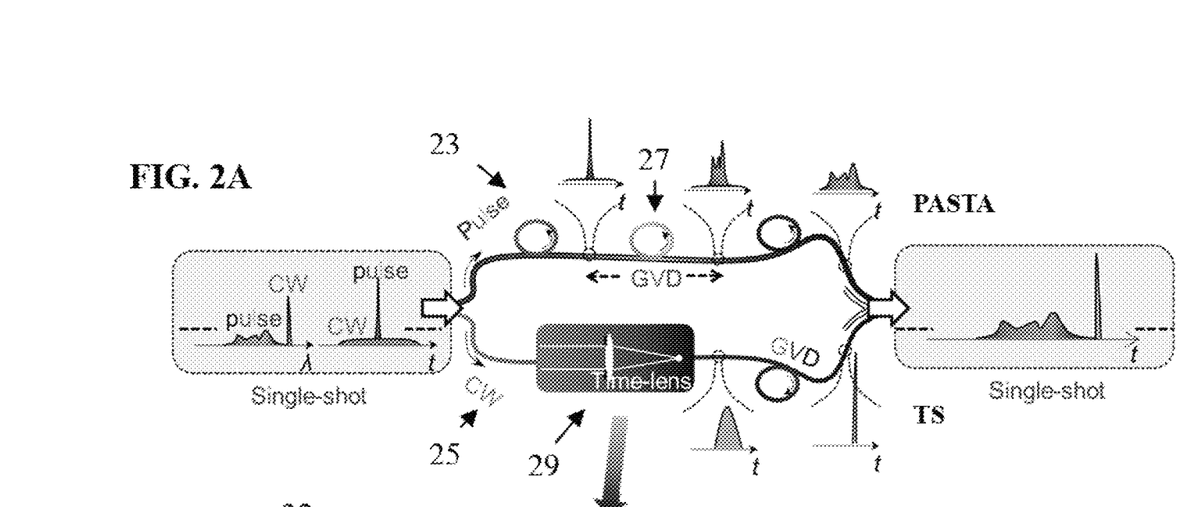
FIG. 2A is a schematic illustration of the working principle of the frequency domain in the ROSTA system according to an embodiment of the present invention, i.e., an upper branch of TSS and a lower branch of TLS.

In the frequency domain, the spectral information of the optical signal is diagnosed in two complementary sub-channels 23, 25 which respectively visualize the ultra-short pulse components as well as the CW/quasi-CW components in a single-shot manner, as shown in FIG. 2A. The spectral information of the short-pulse component is mainly captured by pulse/TS spectroscope 23, i.e., the upper branch in FIG. 2A. In the pulse/TS spectroscope, the optical signal is linearly chirped by large group-velocity dispersion (GVD) medium 27. As a result different wavelength components propagate at different group velocities, $v_g = c/n_g(\lambda)$, thus performing frequency-to-time mapping for ultrashort-pulses. Consequently, the spectral information can be simply detected by another high-speed PD. The spectral resolution of the pulse/TS spectroscope 23 is largely determined by the dispersion amount. Typically, a spectral resolution of 10's picometers (pm) is achievable with a GVD of few ns/nm, which is easily obtained from dispersive media currently available, e.g., dispersive fiber and chirped fiber Bragg grating (CFBG). The frame rate of the pulse/TS spectroscope 23 ranges from 10's to 100's MHz, specifically determined by the frequency of the optical events.

Figure 2B:
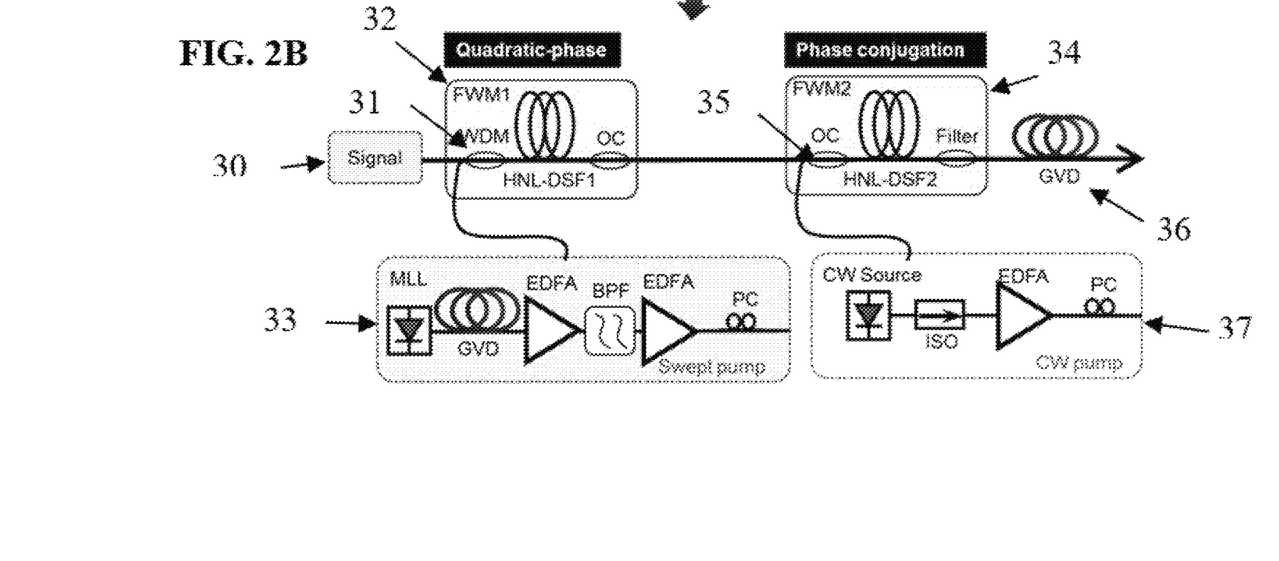
FIG. 2B is a schematic illustration of TLS for CW spectrum acquisition.

The CW/TL spectroscope 25 in FIG. 2A is a temporal imaging system enabling ultrafast spectral analysis through temporal focusing, i.e., a parametric spectro-temporal analyzer. By incorporating dispersion and quadratic temporal phase modulation (or time-lens), the CW/TL spectroscope is equivalent to a temporal 2f system—focusing different optical frequency components into short pulses with different time delays, thus realizing the frequency-to-time mapping for CW/quasi-CW components. FIG. 2B shows the detailed implementation of CW/TL spectroscope 25.

In FIG. 2B the input CW signal 30 is applied to a Quadratic-phase circuit 32 (time lens) that performs four-wave mixing (FWM1). The signal is first applied to a wavelength-division multiplexing (WDM) circuit 31 which mixes it with a signal from a swept pump circuit 33. The pump circuit 33 includes a mode-locked laser (MLL) whose output is generated by linearly chirping a laser pulse. The MLL output is applied to a GVD medium. This GVD output is received by an erbium-doped fiber amplifier (EDFA). The amplifier output is passed through a band-pass filter (BPF) to a second EDFA and then to a polarization controller (PC).

The WDM output from mixing the input signal with the swept pump signal 33 is applied to a highly nonlinear dispersion-shifted fiber (HNL-DSF1), whose output is passed through an optical coupler (OC) to form the output of the Quadratic-phase modulation circuit 32. The output of Quadratic-phase modulation circuit 32 is received by a Phase Conjugation circuit 34 that performs a second four-wave mixing (FWM2). The signal from Quadratic-phase modulation circuit 32 is coupled with a signal from CW pump 37 in an optical coupler 35.

The CW pump signal is formed with a CW Source, whose output is passed through isolator (ISO). From the ISO the signal is received by an EDFA, which passes it to a PC.

After the OC in the Phase Conjugation circuit 34, the signal is passed to a second highly nonlinear dispersion-shifted fiber (HNL-DSF2) and then to a filter. The phase-conjugation signal passes through output GVD medium 36 as the CW/TL spectroscope 25 signal. In effect, CW/TL spectroscopy performs optical Fourier transform on the input signal, mapping the spectral information into the time domain. FWM2 is used not only to invert the quadratic phase of the signal from FWM1, but also to shift the signal center wavelength back to the initial one.

Assume an input CW signal 30 at $\lambda$, the optical signal launched into the CW/TL spectroscope can be expressed as $$E_s = A \cdot rect\left(\frac{\tau}{T}\right) \exp\left(i \frac{2\pi c}{\lambda} t\right), \quad (1)$$

where A is the amplitude and T is the incident aperture of the time-lens. The CW signal falling into the incident aperture of the time-lens will experience quadratic phase modulation analogous to a spatial thin lens, and results in $$E_{time-lens} = E_s \cdot P(t) = \eta E_s \exp\left(-i \frac{t^2}{2\Phi''_f}\right), \quad (2)$$

where P(t) is the impulse response of the time-lens, while $\eta$ and $\Phi''_f$ are the intensity coefficient and focal GVD of the time-lens, respectively. The optical signal after the time-lens is imprinted with a linear chirp and can be compressed into a transform-limited pulse via an output GVD 36, i.e., $$E_{output} = E_{time-lens} * C(t) = E_{time-lens} * \frac{1}{\sqrt{2\pi \Phi''_o i}} \exp\left(\frac{it^2}{2\Phi''_o}\right), \quad (3)$$

where C(t) and $\Phi''_o$ are the impulse response and dispersion amount of output GVD. * represents the convolution operation. Let $\Phi''_o = \Phi''_f$, the final CW/TL-spectroscopic output can be simplified to be $$E_{output} - BSinc\left[\frac{T}{\Phi''_o}\left(i - \frac{2\pi c}{\lambda}\Phi''_o\right)\right], \quad (4)$$

where B includes the constant coefficient and phase terms. From Eq. (4), it is clear that every CW wavelength component passing through the CW/TL spectroscope will be output as a short pulse with a frequency-dependent time delay, $$\frac{2\pi c}{\lambda} \Phi''_o.$$

Consequently, the spectral information can be obtained by time-domain detection. The spectral resolution of the CW/TL spectroscope is given by $$\Delta \lambda = \frac{\Delta t \lambda^2}{2\pi c \Phi''_o}, \quad (5)$$

where $\Delta t$ is the temporal resolution of the electrical detection system. In this analysis, the temporal quadratic phase modulation is realized by a fiber-based four-wave mixings (FWMs) while the GVD is provided by dispersive media. The frame rate of CW/TL spectroscope can be 10's-100's MHz, specifically determined by the repetition rate of the swept pump 33 used in FWM1 32, e.g., 90 MHz in the preliminary study. Its spectral resolution is mainly determined by the output GVD media 36, and can be 10's pm, e.g., 30 pm in the preliminary study.

The outputs of the TS and TL spectroscopes complement each other perfectly and enable accurate spectral diagnosis for all kinds of input conditions from CW to ultra-short pulses. Finally, the real-time spectral information of ultra-short-pulses and CW/quasi-CW components, respectively from the TS and TL spectroscopes are reconstructed into a complete optical spectrum in a single-shot manner through data processing circuit 19 in FIG. 2A. Processor 19 engages in channel alignment, wavelength and intensity calibrations, as well as resampling or combining TS and TL spectroscopic signals to fully obtain spectral information of the dynamic evolution of a non-recurring phenomenon.

While the ROSTA provides both time- and frequency-domain information of laser dynamic operation by integrating the real-time messages from TSS and TLS, the signal experience different time delays due to different optical paths. Therefore, even though the same event from the diagnosed source is launched into these channels simultaneously, the corresponding processed signals arrive at the real-time processor 19 at different times. To accurately obtain one-to-one events between time and frequency domains, the time delays between different channels are measured and used for subsequent signal alignment.

As the temporal waveforms delivering by TSS and TLS channels by themselves have no wavelength coordinate, wavelength calibration is required for those consecutive temporal waveforms before correctly interpreting spectral information. For wavelength calibration of TLS, a 20-channel arrayed waveguide grating with a channel spacing of 100-GHz is used to multiplex seven CW lasers together, each of which having a line width of ~50 kHz. The multiplexed CW-signal is simultaneously measured by both a conventional optical spectrum analyzer (OSA) and TLS. By simply projecting the pulse pattern of the TLS waveform on to that of the OSA spectrum, a wavelength-to-time mapping curve can be obtained. By calibrating with this frequency-to-time mapping curve, the TLS spectrum can be matched with the OSA spectrum. Since this mapping curve is determined by the output dispersion in the TLS implementation, it is fixed throughout all experiments. In addition, there are two methods to expedite the data capturing and processing: i) the whole ROSTA system can be synchronized/triggered by a time reference, provided by the MLL pump source in the PASTA setup, ii) a weak CW reference at 1537.5 nm can be launched together with the optical signal into the TLS through a fiber coupler. Consequently, the time reference (i.e. MLL trigger), spectral mark (i.e. the weak CW reference) and mapping ratio largely facilitate the data capturing and processing in the TLS channel.

For wavelength calibration of TSS, first the mapping ratio from frequency to time is given by the GVD used for pulse chirping. Given that the TSS waveform train is always synchronized with its time-domain companion, both temporal reference and spectral mark can be provided.

Since there is no single-shot spectrum reference for the spectrum intensity calibrations of TSS and TLS, relative intensity calibrations are provided for TSS and TLS in following way: a steady mode-locked laser with coexisting CW and broadband pulse is captured by all TSS, TLS and OSA. Both TSS and TLS spectra are averaged over 20 µs (or longer) to simulate the case of conventional OSA. The watt-to-voltage mapping ratios are obtained through comparing the voltage intensity of both TSS and TLS spectra with the power intensity of OSA spectrum. Although it does not affect the validity of spectral analysis of ROSTA, it should be noted that the spectrum intensity calibration performed is relatively accurate since it can be affected by the loss difference between different channels, nonlinear response of the PDs and also the accumulation time of in OSA.

With wavelength and its intensity calibration known, the spectral information from TSS and TLS is ready to be combined to reconstruct a full spectral evolution. First the one dimensional waveform trains of both TSS and TLS are sectioned into 2D matrixes. The sectioning period is determined by their own frame rates, i.e., the pulse repetition rates of the dynamic source under test for TSS and that of the swept source for TLS. The waveform segments are vertically stacked up along the propagation time delay. Then, wavelength and intensity calibrations are performed on those sectioned frames based on what has been obtained before respectively for TSS and TLS. It is noted that TSS and TLS have mismatched frame rates and frequency-to-time mapping ratios. Thus these spectral evolution 2D matrixes have different sizes. To facilitate combining, data resampling is applied to the denser one, i.e., TLS. Finally, these two spectral evolution matrices can be simply added up based on the criteria introduced at the beginning of this section.

Figure 2C:
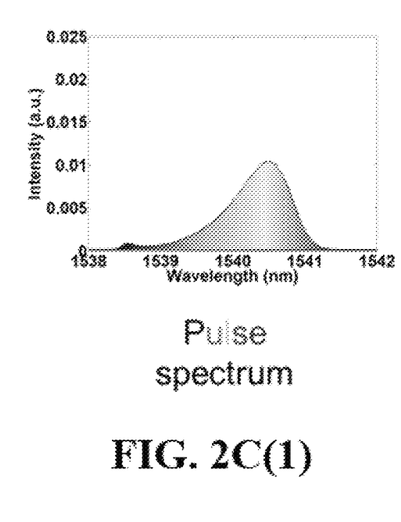
FIG. 2C is an example of the acquisition of frequency information by the ROSTA system according to an embodiment of the present invention.

FIG. 2C showcases single-shot spectroscopy captured by ROSTA for an optical signal including both short-pulse and CW components. It is clear that the single-shot optical spectra of the short-pulse (FIG. 2C(1)) and CW components (FIG. 2C(2)), respectively, captured by TSS and TLS 23, 25 are effectively integrated to provide a complete optical spectrum (FIG. 2C(3)), which matches well with the optical spectrum captured by the conventional optical spectral analyzer (OSA), i.e., the pink dashed curve in FIG. 2C(3).

Figure 3A:
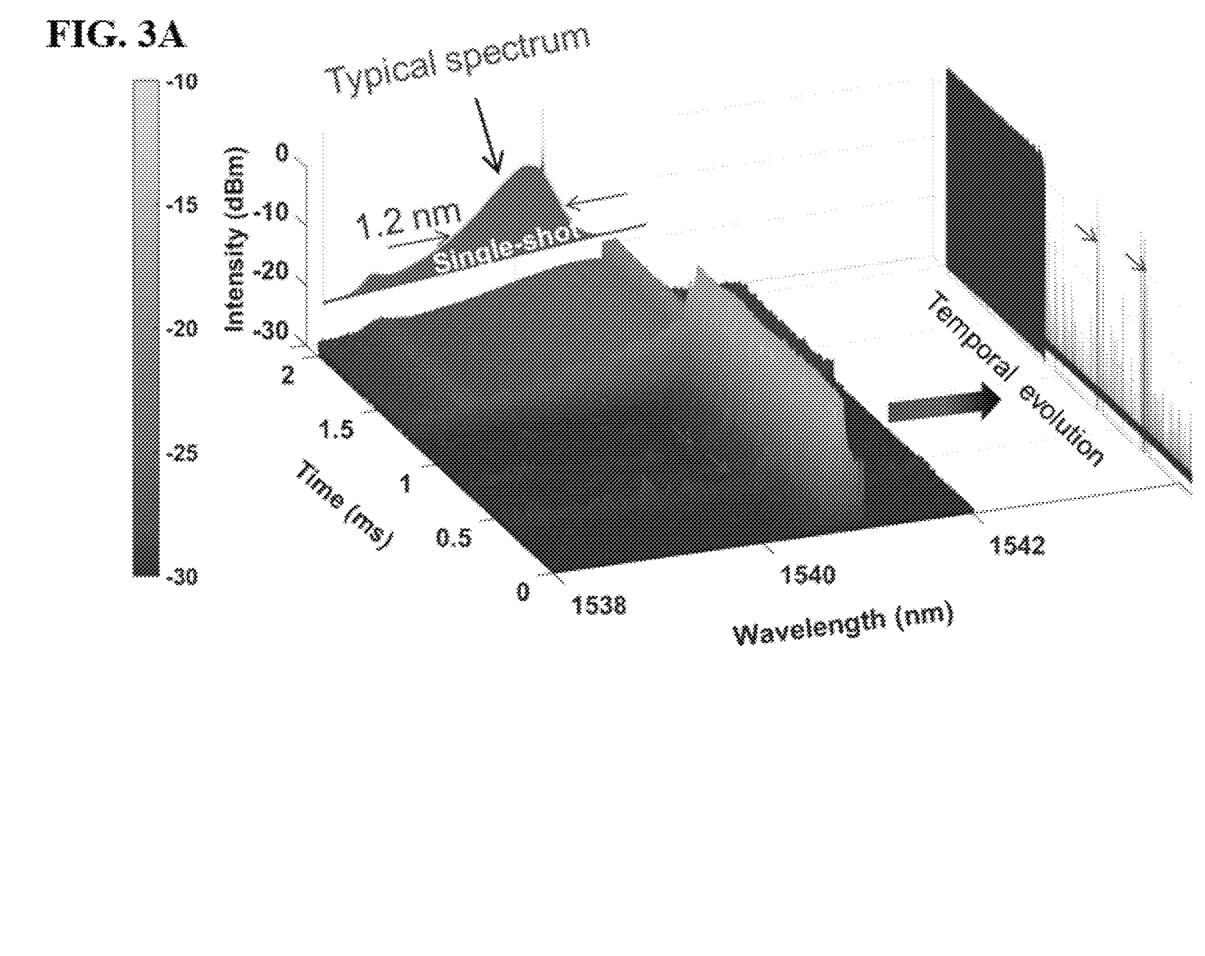
FIG. 3A is the spectro-temporal map of mode-locking birth with coexisting pulse and quasi-CW components with the temporal and spectral evolutions, i.e., time (left) and frequency (right) domains, respectively.

To showcase its applications, the onset of a passively mode-locked fiber laser was analyzed with ROSTA. In this preliminary study, ROSTA had a temporal resolution of 70 ps in the time domain and 11.2 ns in the frequency domain, with a spectral resolution of 130 pm for a pulse signal and 30 pm for a CW signal. The temporal and spectral evolutions during the birth of mode-locking are illustrated in FIG. 3A. At the very beginning, the fiber laser emits quasi-CW irradiation, centered at around 1540.8 nm, which lasts for about 1.2 ms. In the time domain, obvious noise pulse bursts appears every ~21 µs. In the frequency domain, corresponding fluctuations are shown as periodic intensity modulation on the narrowband component. Generally, the intensity of an ultrashort pulse can be orders of magnitude higher than that of CW component. Thus, the optical signal launched to a photoreceiver is usually attenuated to avoid saturation. Consequently, the generated DC electrical signal from the CW component (if any) can be buried in the electrical noise, due to the limitation of dynamic range of an analog-to-digital digitizer. Benefitting from a high temporal resolution of ROSTA in the frequency domain, the CW intensity can be recovered from the single-shot spectral signal.

Figures 3B, 3C:
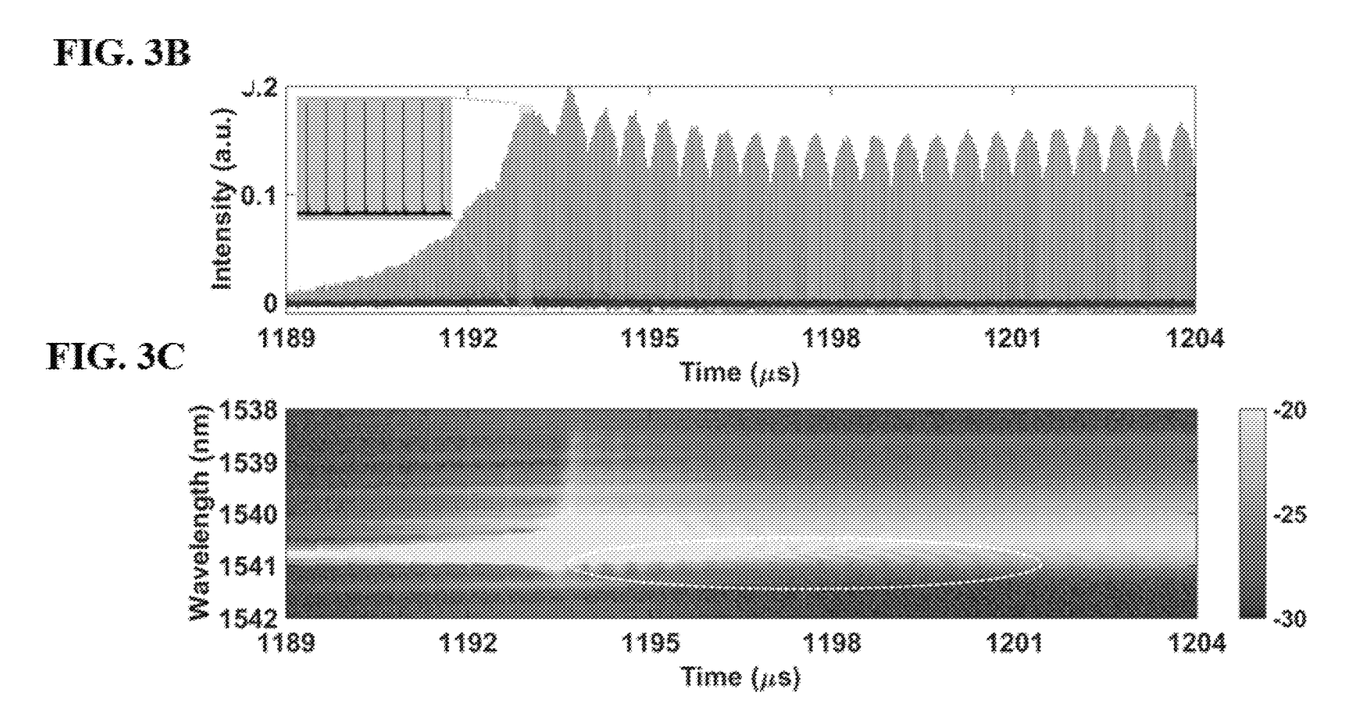
FIGS. 3B and 3C are close-ups of the temporal and spectral evolutions of the rapid transition, respectively, i.e., from strong fluctuation to mode-locking.

Strong spectral broadenings occur at around 0.4 and 0.8 ms, i.e., the areas indicated by the red arrows in FIG. 3A. In the time domain, it is manifested by stronger Q-switched-like fluctuations. In response to these strong fluctuations, the elongated and asymmetrical wavepacket is likely at the onset of the mode-locking. This is because mode-locking typically can be realized if a prolonging fluctuation survives for a long enough time and until it becomes stable. After "loitering" for about 1.2 ms, another strong Q-switched-like fluctuation appears. Different from the last two cases at ~0.4 and 0.8 ms, it survives after a short period (about 20 µs) of intensity adjustment. Under the main wavepacket, a pulse train separated by the round-trip time of the fiber cavity, i.e., ~34 ns, gradually builds up. The growing pulse, on the other hand, implies a narrowing pulse width, since a successfully-surviving pulse can be compressed every round trip by the mode-locker until the compression is balanced by the broadening factors, mainly the dispersion. It can also be identified by the gradually broadening of the single-shot optical spectrum, as shown in FIG. 3C. The inset of FIG. 3A shows a typical single-shot optical spectrum after successful mode-locking. It has a 3-dB spectral width of ~1.2 nm, corresponding to a 3-ps transform-limited pulse. After mode-locking, the pulse train becomes much cleaner compared to those in the fluctuated stage. Typically, a mode-locking process normally results in a pure short-pulse without any CW/quasi-CW components. Interestingly, here the mode-locking finally coexists with the quasi-CW component inside the fiber cavity. It is emphasized that this sharp quasi-CW peak sitting on the broad mode-locked spectrum is shown only at the TLS, but not the TSS, which confirms that it is a CW/quasi-CW component. The intensity of this component, however, is reduced by ~7 dB compared to the case before mode-locking, which can be attributed to the fact that the coexisting mode-locked pulse has drawn part of the optical gain to support its oscillation. It is noted that the mode-locked pulse train exhibits an additional intensity modulation, as shown in FIG. 3B. In response to the intensity modulation in the time domain shown in FIG. 3B, its optical spectrum evolves with bandwidth breathing, denoted by the white dashed circle in FIG. 3C.

The birth of mode-locking coexisting with a quasi-CW component is completely captured by ROSTA. Spectral breathing of the mode-locked pulse is observed. This is the first demonstration that mode-locking is onset together with quasi-CW background at such a high temporal resolution in both time and frequency domains. It can largely broaden the horizon of the understanding of physics of passive mode-locking dynamics.

While the present invention has been particularly shown and described with reference to preferred embodiments thereof; it will be understood by those skilled in the art that various changes in form and details may be made therein without departing from the spirit and scope of the invention.

What is claimed is:

1. A versatile optical signal analyzing apparatus that enables real-time and single-shot analysis in both time and frequency domains simultaneously for non-repetitive ultra-fast optical events with spectro-temporal analysis, comprises:
    a fiber-tap coupler for receiving an input optical signal from continuous wave (CW) to ultra-short pulses;
    an optical splitter which directs part of the input optical signal to a frequency channel and part to a time channel;
    a high-speed photodiode in the time channel directly monitors time domain intensity evolution and converts it to an electrical signal;
    two sub-channels specified for CW/quasi-CW and short-pulse components form the frequency channel in which spectroscopes determine frequency domain spectral intensity evolution for the CW/quasi-CW and short-pulse components, respectively;
    a signal processor that analyses the frequency and time domain intensity evolutions from the time channel and frequency channels; and
    a display of the time domain intensity evolution and frequency domain spectral intensity evolutions simultaneously so that the frequency and time domain evolutions of a non-repeated dynamic event can be correlated in the frequency and time domains.

2. The optical signal analyzing apparatus of claim 1 wherein the input optical signal can be from any optical sources at wavelengths within the operating window of a real time optical spectra-temporal analyzer (ROSTA), i.e., 1400-1700 nm for short pulse component and 1538-1543 nm for CW/quasi-CW component.

3. The optical signal analyzing apparatus of claim 1 wherein the photodiode has a bandwidth of at least 10 GHz, and a temporal resolution is 10's of ps for time-domain information.

4. The optical signal analyzing apparatus of claim 1 wherein the time channel further includes a multi-channels digitizer that samples the electrical signal from the photodiode at a Nyquist rate and with a time record in the millisecond range.

5. The optical signal analyzing apparatus of claim 4 wherein the data rate of the electrical signal from the multi-channels digitizer is 40 GS/s and its temporal resolution is ~50 ps.

6. The optical signal analyzing apparatus of claim 1 wherein the sub-channels in the frequency channel are complementary and respectively visualize the ultra-short-pulse components with a pulse/time stretch (TS) spectroscope and the CW/quasi-CW components with a CW/time lens (TL) spectroscope in a single-shot manner.

7. The optical signal analyzing apparatus of claim 6 wherein in the pulse/TS spectroscope, the optical signal is linearly chirped by a large group-velocity dispersion (GVD) medium so that different wavelength components propagate at different group velocities, thus performing frequency-to-time mapping for ultra-short-pulses.

8. The optical signal analyzing apparatus of claim 7 wherein the spectral information in the pulse/TS spectroscope is also detected by a high-speed photo detector.

9. The optical signal analyzing apparatus of claim 7 wherein a spectral resolution of the pulse/TS spectroscope is largely determined by the dispersion amount of the GVD medium, where the dispersive media is one of a dispersive fiber and chirped fiber Bragg grating (CFBG).

10. The optical signal analyzing apparatus of claim 6 wherein the CW/TL spectroscope is a temporal imaging system enabling ultrafast spectral analysis through temporal focusing by incorporating one of temporal quadratic phase modulation and dispersion, and temporal imaging.

11. The optical signal analyzing apparatus of claim 10 wherein the CW/TL spectroscope focuses different optical frequency components into short pulses with different time delays, thus realizing a frequency-to-time mapping for CW/quasi-CW components.

12. The optical signal analyzing apparatus of claim 6 wherein the CW/TL spectroscope comprises a quadratic phase modulation device that receives an input CW/quasi-CW signal and performs four-wave mixing (FWM1) of the input signal, the output of the quadratic phase modulation device is applied to a Phase Conjugation device that performs a second four-wave mixing (FWM2), and the output of the Phase Conjugation device is applied to a GVD medium to form the transform-limited output.

13. The optical signal analyzing apparatus of claim 12 wherein the Quadratic Phase modulation device comprises a wavelength-division multiplexing (WDM) circuit that mixes the input signal with a signal from a swept pump, the WDM circuit output is passed through a highly nonlinear dispersion-shifted fiber HNL-DSF1 to an optical coupler (OC) to form the output of the Quadratic Phase modulation device.

14. The optical signal analyzing apparatus of claim 13 wherein the swept pump comprises a mode-locked laser (MLL) whose output is applied to a GVD medium, the GVD output is received by an erbium-doped fiber amplifier (EDFA), the amplifier output is passed through a band-pass filter (BPF) to a second EDFA and then to a polarization controller (PC) which outputs the swept frequency signal.

15. The optical signal analyzing apparatus of claim 12 wherein the Phase Conjugation device comprises an OC that couples the input signal with a CW pump signal, the output of the OC is passed through a highly nonlinear dispersion-shifted fiber HNL-DSF2 and a filter to form the output of the Phase Conjugation device.

16. The optical signal analyzing apparatus of claim 15 wherein the CW pump signal of FWM2 is generated by a CW Source whose output is passed through an isolator (ISO), the ISO signal is received by an EDFA, which passes it to a PC to form the CW pump signal.

17. The optical signal analyzing apparatus of claim 1 wherein the signal processor preforms channel alignment of the signals in the time channel and the signal in the sub-channels in the frequency domain, calibrates the wavelength and intensity of the channel signals and combines the aligned and calibrated channel signals.

18. A method for signal analysis of non-recurring optical phenomenon ranging from ultra-short pulses (femtosecond to picosecond) to quasi-CW in real-time in both time and frequency domains simultaneously for non-repetitive ultra-fast optical events with spectral analysis, comprising the steps of:
    receiving an input optical signal in the range from ultra-short pulses to CW;
    directing part of the input optical signal to a frequency channel and part to a time channel;
    directly monitoring with a photodiode in the time channel an intensity evolution of the input optical signal and converting it to an electrical signal;
    directing the input optical signal in the frequency channel into two sub-channels specified for CW/quasi-CW and short-pulse components, respectively, one sub channel processes the signal by a time stretch (TS) process and the other processes the signal by a parametric time-lens (TL) imaging process to form a frequency domain spectral intensity evolution;
    analyzing in a processor the time- and frequency-domain intensity evolutions respectively from the time channel and frequency channel; and
    displaying the analyzed time domain and frequency domain intensity spectral evolutions simultaneously so that the frequency and time domain evolutions of a non-recurring dynamic event can be correlated in the frequency and time domains.

19. The method of claim 18 wherein the TL imaging process of one of the sub-channels of the frequency channel involves the steps of:
    applying the input signal to a quadratic phase modulation device;
    mixing the input signal in a WDM circuit of the quadratic-phase modulation device with a signal from a swept pump;
    passing the output from a highly nonlinear dispersion-shifted fiber (HNL-DSF1) to an optical coupler;
    forming the output of the optical coupler as the output of quadratic phase modulation device;
    applying the output of the quadratic phase modulation device to a phase conjugation device,
    coupling quadratic phase modulation device output with a CW pump signal through an optical coupler of the phase conjugation device,
    passing the coupled signal through a second highly non-linear dispersion-shifted fiber (HNL-DSF2);
    filtering the output of the HNL-DSF2; and
    passing the filter output through a large GVD medium to form the TLS signal.

* * * * *